Oct. 5, 1943.                H. JEZLER                2,330,894
                    MOTORCAR WITH PARKING DEVICE
                Filed Aug. 13, 1941           7 Sheets-Sheet 1

Inventor
Hubert Jezler
by Singer, Ehlert, Stern & Carlberg
his Attorneys

Oct. 5, 1943.   H. JEZLER   2,330,894
MOTORCAR WITH PARKING DEVICE
Filed Aug. 13, 1941   7 Sheets-Sheet 4

Inventor
Hubert Jezler
by Singer, Ehlert, Stern & Carlberg
his Attorneys

Patented Oct. 5, 1943

2,330,894

UNITED STATES PATENT OFFICE 2,330,894

MOTORCAR WITH PARKING DEVICE

Hubert Jezler, Zurich, Switzerland

Application August 13, 1941, Serial No. 406,737

14 Claims. (Cl. 180—1)

To park a motor car in a congested street or garage presents some difficulties, even to otherwise excellent drivers. The space available to park a car is mostly very restricted and needs expert steering to get the car in alignment with cars already parked. The same difficulties arise to regain the road when the space left to the parked car is but slightly longer than the car itself.

The main object of the invention consists in the provision of a device to assist the drivers.

I attain this object by the provision of means adapted to shift the fore part of a car standing at rest sufficiently sideways to either side to get the car clear to drive forwards out to the road. In parking the rear wheels of the car are driven in the free space by reversing and the fore end is swung sideways as described to bring the car into its proper parking position.

In the accompanying drawings the invention is shown by way of an example in diagrammatical manner.

Figs. 11, 12, 13 and 14 show in sectional elevation a second embodiment of my invention, Fig. 11 being a side elevation, and Figs. 12 and 13 sectional elevation with the jacking device in the raised and lowered positions, respectively.

Fig. 14 is a cross-section on line XIV—XIV of Fig. 13.

Fig. 15 is a fragmentary view of a modified clutch mechanism.

Figure 1:
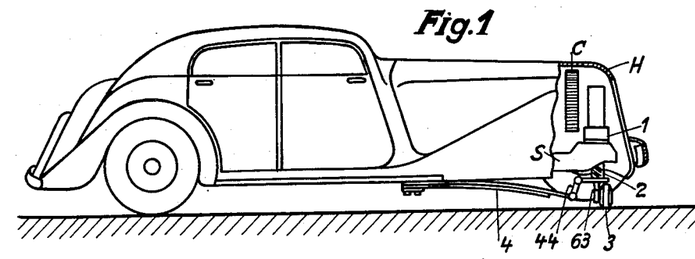
Fig. 1 is a side elevation of a motor car illustrating the position of the new lifting device.
Figure 2:
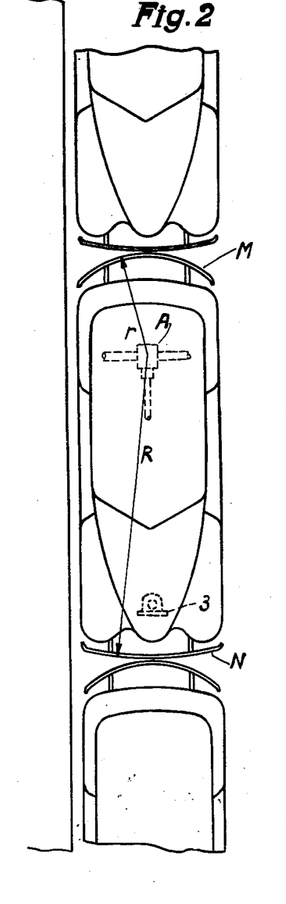
Fig. 2 shows a row of motorcars close together with no free space between them.
Figures 5, 6:
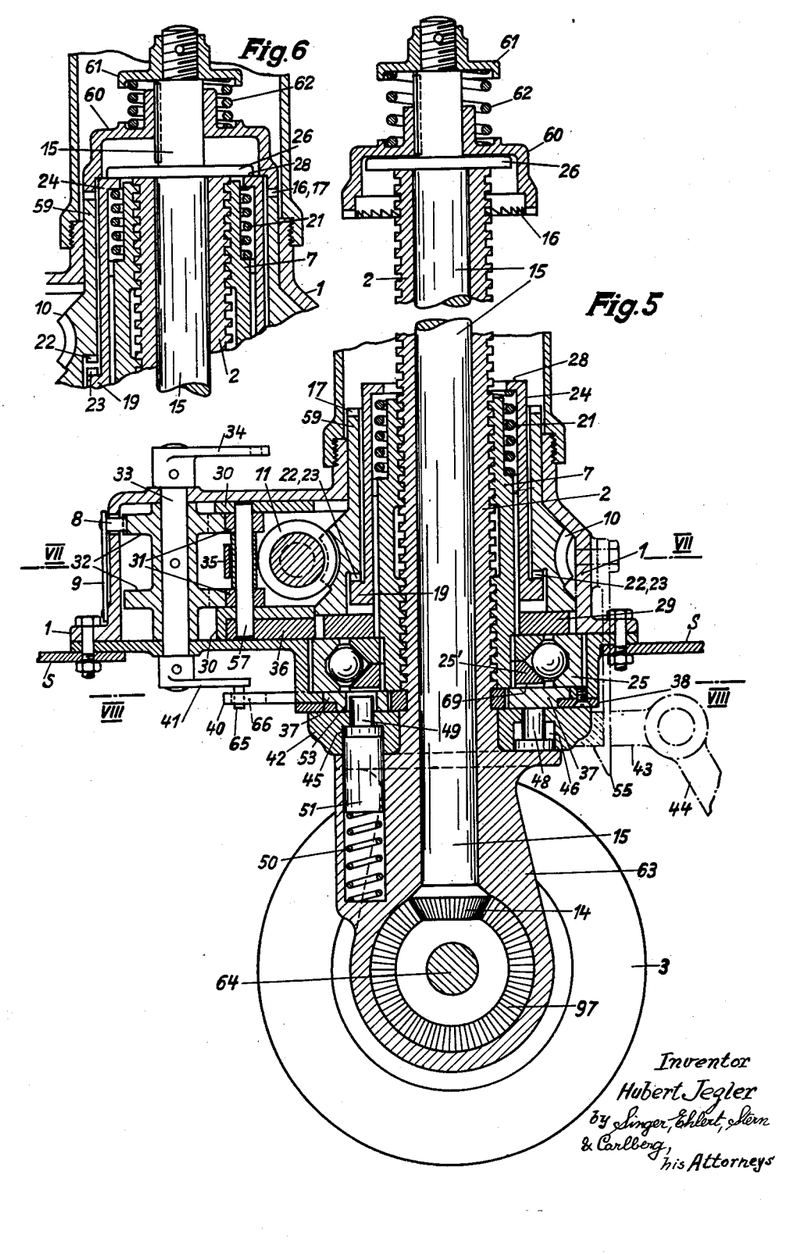
Figs. 5 to 8 are sections taken on the lines V—V; VI—VI; VII—VII and VIII—VIII of Figs. 4 and 5.
Figure 7:
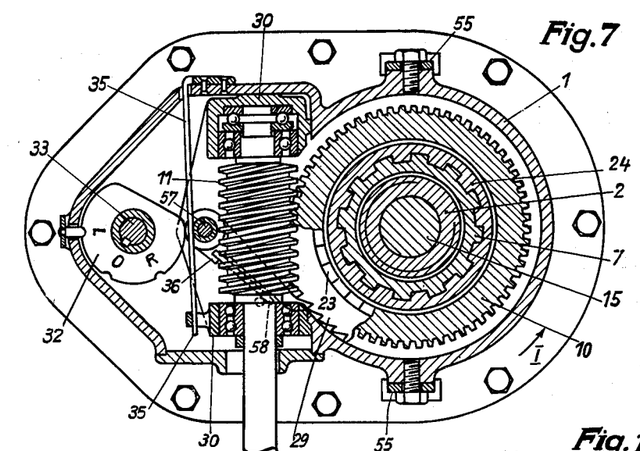
Figures 8, 10:
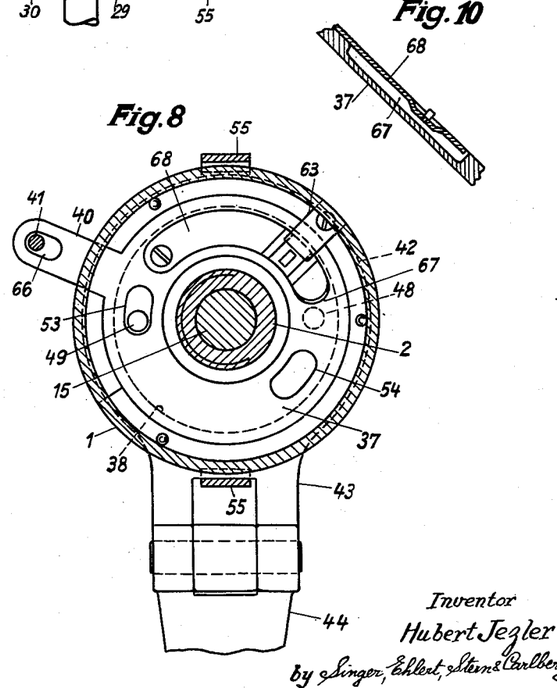
Fig. 10 is a sectional elevation of a catching device.

The packing device 1 is arranged in front of the cooler C and within the hood H of the motor car, and is fastened to the cross-stay S of the chassis of the car. In Fig. 1 the motor car is shown raised resting on a roller 3 to turn the front end of the car about a vertical axis, Fig. 2, at or near the differential gear A of the car. To get the car free out of the row without damaging or disturbing the adjacent cars the bumpers M and N form part of circles with the radii $r$ and $R$, respectively. The jacking device proper comprises a hollow screw threaded spindle 2 which is axially displaceable in the casing 1. The spindle 2 engages a nut 7 rotatably mounted by means of a ball bearing 25 in the casing 1. On the nut 7 a sleeve 24 is slidably mounted, the nut 7 and the sleeve 24 are coupled by keys and grooves running in axial direction, the keys projecting from the outer circumference of the nut 7 into the grooves. The sleeve 24 is provided at its upper end with a flange (projecting inwardly). Between said flange 28 and a shoulder on the nut 7 a coiled spring 21 is arranged. The sleeve 24 is provided at its lower end with an outwardly projecting flange 19. The said flange 19 is provided with a row of teeth 23 engaging a circular row of teeth 22 formed on a worm wheel 10. The latter is rotatably mounted in the casing 1, and is driven by the worm 11 from the shaft of the motor of the car. An elastic clutch 5 is interposed between the worm 11 and the motor shaft. The worm 11 is journalled in a slide 30, and may be brought in and out of engagement with the worm wheel 10 by means of two cam discs 32 fixed on a common spindle 33. The latter being mounted in the casing and carries an arm 34 connected by a flexible member 56 with one arm of a hand lever 52 pivoted at or near the seat of the driver of the car. The cam disc 32 cooperates with two rollers 31 mounted on a bolt 57 fixed to the slide 30. A blade spring 35 keeps the rollers 31 in contact with the cam discs 32. On the bolt 57 a pawl 36 is arranged. The pawl 36 is held in engagement with ratchet gear 29 by a spring 58. The ratchet gear is rigidly fixed to the nut 7. While the worm 11 is in engagement with the worm wheel 10 the pawl 9 allows the turning of the nut 7 in but one direction denoted by the arrow I, Fig. 7. The worm wheel 10 is provided with a tubular extension 59, the upper face of which being toothed at 17. In the hollow spindle 2 a shaft 15 is rotatably mounted. On the upper end of the shaft 15 a cap 60 is arranged having a toothed rim 16 adapted to engage the toothing 17 of the worm wheel 10. The cap 60 rests on the sleeve 24 on which a disc 26 fixed to spindle 2 comes to rest when the latter has attained its lowermost position (Fig. 6). Between the cap 60 and a flanged nut 61 of the shaft 15 a coiled spring 62 is arranged. The force of the spring 62 exceeds that of spring 21. The spindle 2 is provided at its lower end with a casing 63 in which a short horizontal shaft 64 is rotatably mounted. On the shaft 64 a bevel gear 97 is keyed engaging a bevel gear 14 on the vertical shaft 15. On the shaft 64 a wheel 3 having a rubber tyre is rigidly fixed. The wheel 3 is lowered by the screwing down of the spindle 2, far enough to raise the fore end of the car until the wheels leave the ground, and to get the wheel 3 to carry the car sideways. The direction of rotation of wheel 3 has to be different according to the direction in which the car is to be turned. The change in the direction of rotation of wheel 3 may be effected by turning the casing 63 for about 180°, as the shaft 15 and nut 7 with worm-wheel 10 are driven in the same direction. To turn the casing 63 use is made of the hand lever 52 which turns the shaft 33. On the latter an arm 41 is fastened engaging with a pin 65 a radial slot 66 of an arm 40 of an annular disc 37, slidably supported by a ring 38 fixed to casing 1. The disc 37 is provided with two grooves 53, 54 arranged nearly opposite each other. In either of said grooves 53, 54, one of two studs 48, 49 enters according to the direction in which the car is to be turned. The studs 48, 49 are slidably arranged in bores 45, 46 of a plate 42 which is prevented from turning by an arm 43 and a bar 44. In the plate 42 the spindle 2 is loosely mounted, a ring arranged in a circular groove of the spindle 2 returns the plate 42 in connection with the spindle 2. In the casing 63 a bolt 51 is slidably mounted. A spring 50 tends to push the bolt 51 into either of the bores 45, 46 and to push thereby one of the studs 48, 49 into one of the slots 53, 54, according to the position into which the disc 37 has been brought by the hand lever 52. A spring 4 fixed to the chassis of the car, and acting on lever 44 tends to push the plate 42 downwards away from the casing 1. To keep plate 42 in contact with the casing 1, a number of springy hooks 55 are arranged on the mantle of the casing 1, they release the plate 42 only upon a strong pressure in axial direction exerted by the spindle 2 when being turned by the worm-wheel 10.

Figure 3:
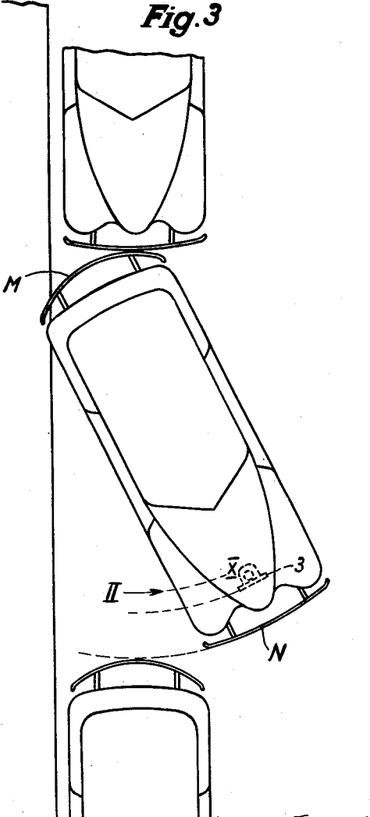
Fig. 3 illustrates the manner to get one of the motor cars out of the row.
Figure 4:
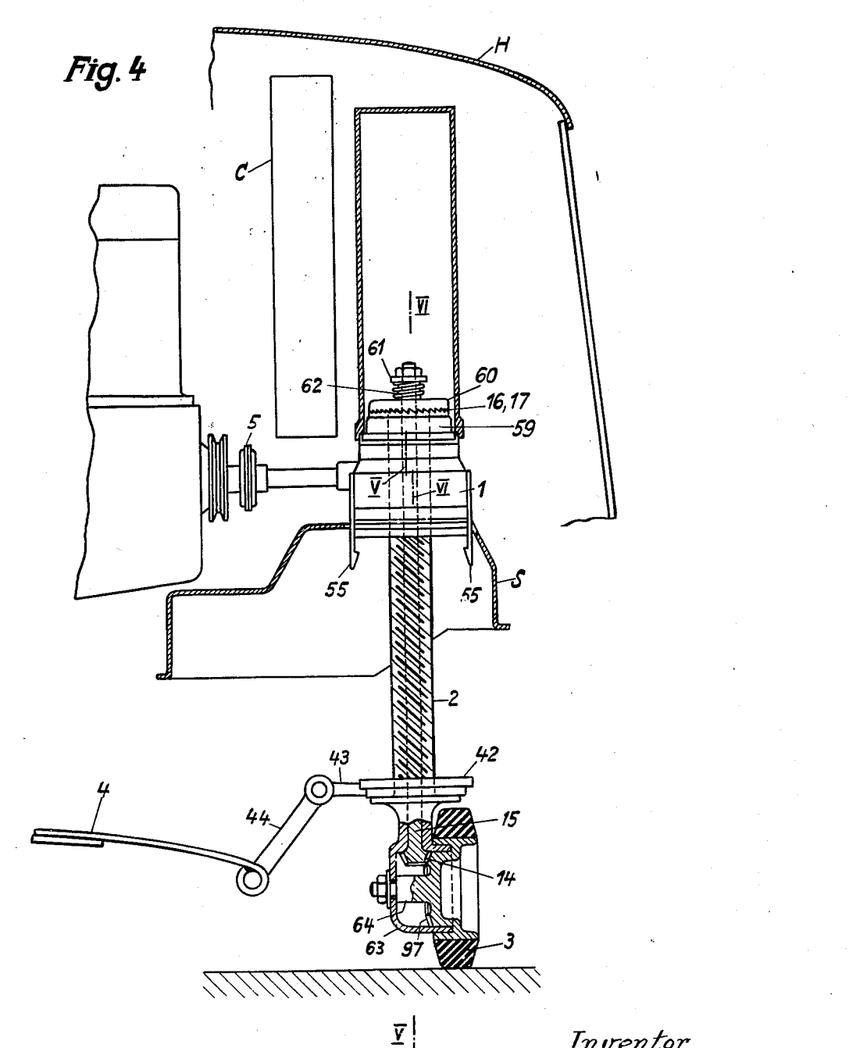
Fig. 4 is a sectional elevation of the front portion of a car with the lifting jack.
Figure 9:
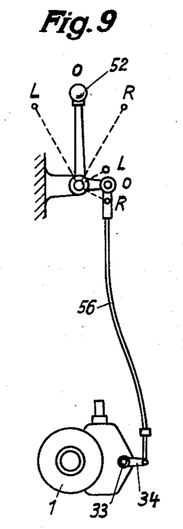
Fig. 9 illustrates the means to actuate the new jacking device.

To bring a car out of a row as illustrated in Fig. 3, the lever 52 is brought into the position L (Fig. 9). The shaft 33 is turned and therewith the cam 32. The latter is provided at its circumference with three notches denoted by R, O, L. A pin 8 fixed to a blade spring 9, Fig. 5, engages the notch L, and keeps the cam 32 in its position. By turning the shaft 33 the worm 11 had been brought in engagement with the worm-wheel 10, moreover the disc 37 has been turned by the arms 40, 41. As soon as worm 11 is in mesh with the worm wheel 10, the latter turns and therewith the sleeve 24, the gears 22, 23 being held in engagement by the spring 21. Owing to friction the spindle 2 and therewith the casing 63 will partake on the motion of the worm-wheel 10. As soon as the bolts 49, 51 arrive in a position in which the bolt 49 can enter a groove 53 of disc 37, the spring 50 will push the bolt 49 upwardly. The bolt 51 passes now into the bore 45 of the plate 42. The casing, and therewith the position of the wheel 3 is secured as the plate 42 is secured against rotation by the members 4, 43, 44. The spindle 2 is stopped rotating and is moved in axial direction by the nut 7 which partakes on the rotation of the worm-wheel 10, the gears 22, 23 being still in engagement. The spindle 2 moves downwardly, the wheel 3 (Fig. 4) touches the ground and the car is lifted into position shown in Fig. 1. Having attained the position the disc 26 of the spindle 2 presses on the rim of sleeve 24, compressing the spring 21 until the teeth 22, 23 come out of engagement. The rotation of the nut 7 is stopped and therewith the axial displacement of the spindle 2. At the same time the teeth 16 of the cap 60 engage the teeth 17 of the worm-wheel 10. The latter drives now by means of said cap 60 the shaft 15, and therewith the wheel 3. The car turns now in the direction of arrow II—X, Fig. 3 until the hand lever 52 is brought into its neutral position O. In this position of the hand lever 52 the cam 32 (Fig. 5) has released the slide 30. The spring 35 brings now the worm 11 out of engagement with the worm-wheel 10. The pawl 36 is withdrawn from the ratchet wheel 29. The car is now free to fall, and owing to its weight the spindle 2 having a comparatively very high pitch, is turned thereby about its axis. The wheel 3 is taken from its position on the ground (Figs. 1, 4) to the position shown in Fig. 5. The spring 4 having been tensioned before, brings the plate 42 to bear on casing 1.

While the car is moved by the roller 3, the nut 7 is prevented from turning on the spindle 2. In a recess 67 of the disc 37 a blade spring 68 is fastened with one end. Near the free end a stud is arranged adapted to engage a groove 69 in the ring 25' of the ball-bearing 25. On the casing 1 a finger 63 is fastened which depresses the spring 68 when the hand lever 52 is brought to its O-position. The stud leaves the recess 25' and the nut 7 is free to turn. The car resumes its normal position and the spring 4 lifts the plate 42 and the wheel 3 from the ground as described above.

Figure 11:
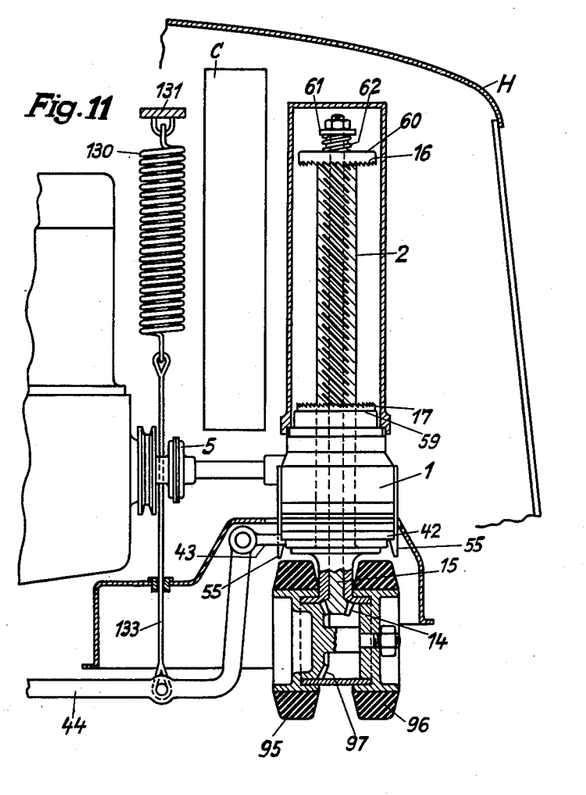

As shown in Fig. 11 a coiled spring 130 fixed with one end on a carrier 131, and with the lower end to the lever 44, by means of a flexible member 133. The shaft of the worm 11 and the motor shaft are inter-connected by a flexible clutch 5. Instead of one wheel, there are two wheels 95, 96 to bear the load.

The device shown in Figs. 12 to 15 as another example of my invention, is arranged in front of the cooler C, and within the motor hood H. The motor of the car drives over an electromagnetic clutch P, and over the speed reduction gears T, non-self-locking worm 161. The latter is in mesh with a worm-wheel 70 rotatably mounted in the casing 100 resting to the front cross-bar 76 of the car body by means of a bracket 177. The worm-wheel 70 is provided with an upwardly projecting toothed flange 78 which engages the toothed rim 79 of a plate 80 axially displaceable on a key 81 of the shaft 82. The plate 80 (Fig. 13) abuts against a washer 84 on said shaft 82. The shaft 82 is journalled in a hollow screw-threaded spindle 92. The spindle 92 is a multiple thread screw and is not self-locking. The lower end of the spindle 92 forms the bearing 94 of two rollers 95, 96 by means of which the fore end of the car may run sideways. The shaft 82 is provided at its lower end with a bevel gear 197 meshing with a toothed shoulder 98 of the roller 95. The hollow spindle 92 engages the internal threading of a sleeve 101. Between a flange of said sleeve 101 projecting outwardly, and a flange 103 of the worm-wheel 70 projecting inwardly, a multiple disc clutch 104 is arranged, the rotations of the worm-wheel 70 are transmitted to said sleeve nut 101 by friction only.

Figures 12, 14, 15:
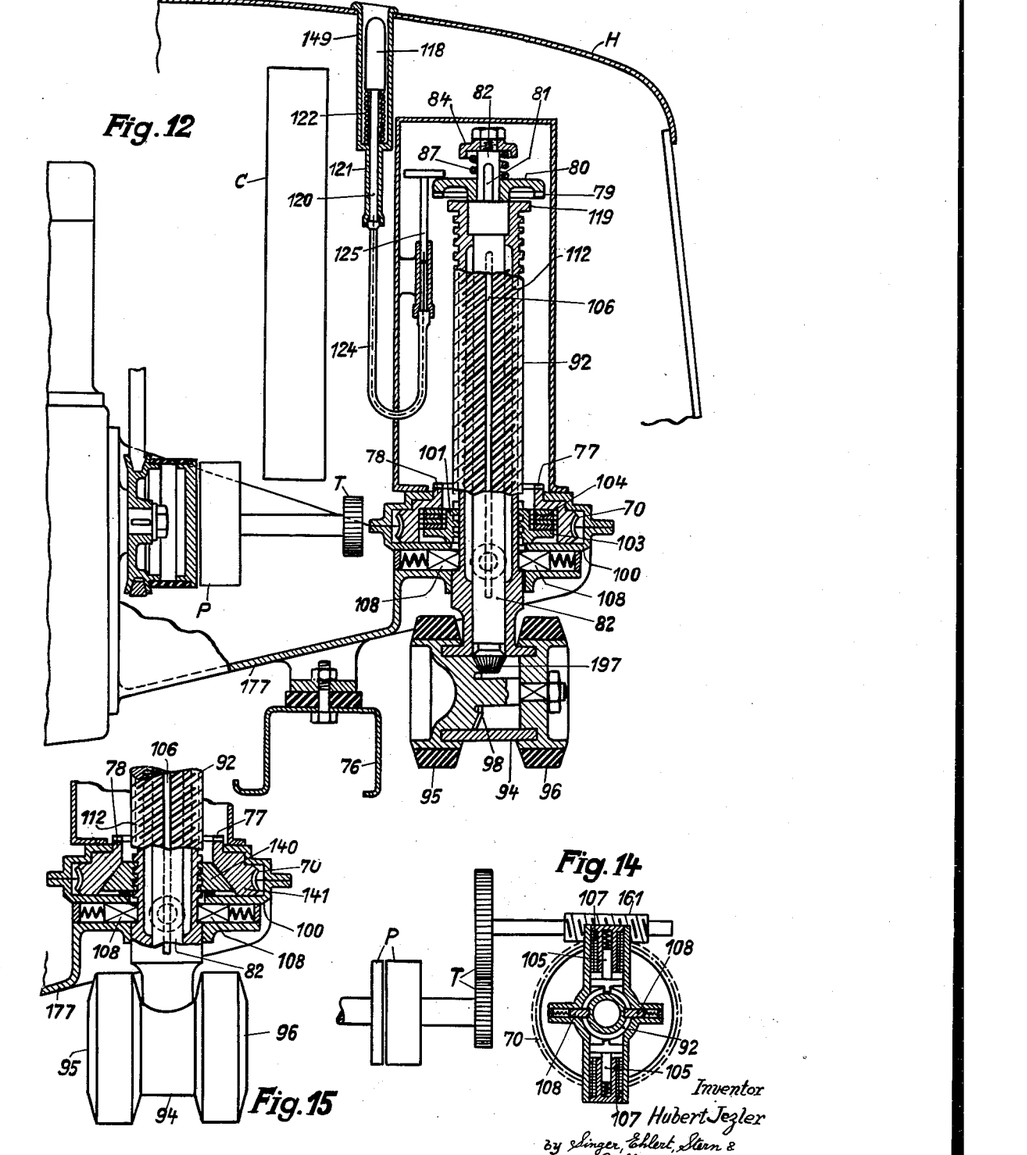
Figure 13:
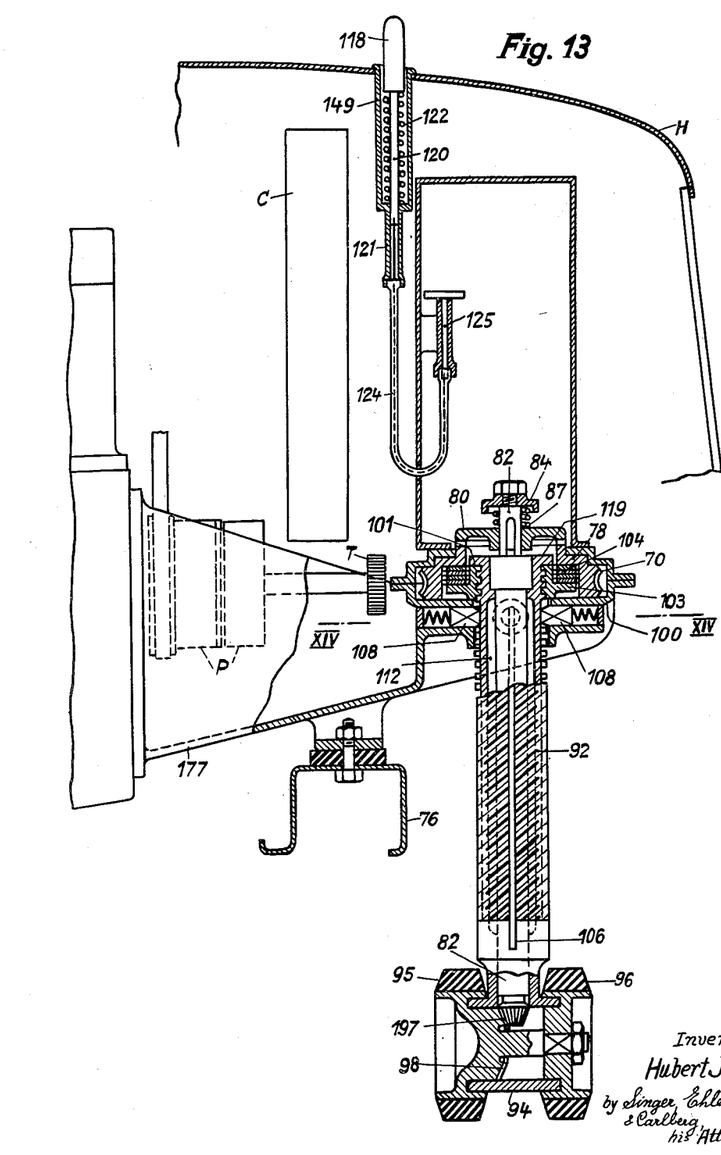

The hollow spindle 92 is secured against rotation by two bolts 105 engaging grooves 106 provided in the shaft 92. The bolts 105 are slidably arranged in radial slots of the casing 100. By turning the sleeve 101 by means of the worm-wheel 70 the spindle 92 is moved in an axial direction. The bolts 105 and the grooves 106 are set 180 degrees apart. The bolts 105 are operated electrically by solenoids 107 and brought out of engagement with the grooves 106 by closing a circuit by means of a switch arranged near the driver's seat. Displaced at a right angle with reference to the bolts 105 there are two spring actuated bolts 108 opposite to each other, each engaging a short groove 112 of the hollow spindle 92. The grooves 106, 112 are different in length and in breadth, the teeth of the bolts 105 being broad can only enter the grooves 106 and not the grooves 112. Any source of electricity may be used, either the usual car battery or a dynamo for the car lamps, and so on.

To show the driver, whether the hollow spindle 92 is in its lowermost position in which the car rests on the roller 95, 96, an index piston 118 is slidably arranged in a vertical guiding sleeve 149 of the hood H. The piston 118 is fixed to a rod 120, passing through a casing 121. A coiled spring 122 arranged between the bottom of the casing 121 and a shoulder of the piston 118 compensates the weight of the piston but partly. The piston 118 is connected by a wire 124 with a feeler 125 resting on the plate 80. If the hollow spindle 92 reaches its uppermost position the wire will withdraw the piston 118 against the action of spring 122, the piston 118 being visible indicates that the rollers 95, 96 are fully withdrawn and out of their working position. Any other indicator may be used for instance an audible signal might be given, lamps might be switched on, and so forth.

The device works as follows: By closing the circuit of the clutch P, the worm 161 drives the screw threaded sleeve 101. The hollow spindle 92 being held by the bolts 105, and secured against turning is moved downwardly in axial direction until the rollers 95, 96 are on the ground. The teeth 79 of the plate 80 are brought in engagement with the teeth 77 of the worm-wheel 70, the spring 87 keeps the clutch well closed. The worm-wheel 70 therefore turns now shaft 82 as soon as the front end of the car has been lifted from the ground sufficiently to allow a lateral displacement. The friction clutch 104, allows the turning of shaft 82, the sleeve 101 being held fast by a flange 119 projecting outwardly at the upper end of the spindle 92. The front end of the car runs now on the rollers 95, 96 sideways in the one or other direction according to the position of the driven roller with reference to the shaft 82. In Fig. 13 the parts are shown in the position while the car is being off its wheels ready to run on the rollers 95, 96. To have the front end of the car moved in the desired direction it is necessary to bring the hollow shaft 92 into the proper position with reference to the shaft 82; to reverse the direction of the motion it is necessary to turn shaft 92 for 180 degrees about its own axis, and with reference to shaft 82 and bevel wheel 97. To make the running of hollow spindle 92 possible all the teeth 105, 108 are to be withdrawn from the slots 106, 112 of the spindle 92, by closing the circuit through the electromagnets. The circuit is being closed a short time only, and as soon as the spindle 92 has turned about 180° the armature of the electro-magnet is being released, and the teeth enter now the grooves of the shaft, retaining the same in the new position.

If the spindle 92 has been driven to its lowermost position the weight of the car is then supported by said spindle 92. To return the spindle 92 to its initial position and to place the car on its own wheels, the retaining members 105, 108 are brought out of the grooves. By the falling of the car the spindle 92 is rotated, and it is screwed up at the same time in the nut 101, the rollers 95, 96 are raised from the ground. Neither the worm 161 nor the spindle 92 is self-locking therefore the spindle 92 will be rotated by the weight of the falling car. By the inertia acquired the spindle 92 will move upwardly and raise the rollers 95, 96 from the ground.

As shown in Fig. 15 the multiple disc clutch may be replaced by a conical clutch. The nut 140 screwed on the spindle 92 is provided with a conical mantle 141 engaging a tapering bore of the worm-wheel 70. The clutch operates essentially in the same manner as that described with reference to Figs. 12, 13.

Without further description it is thought, that the features and advantages of the invention will be readily apparent to those skilled in the art, and it will of course be understood, that changes in the form, proportion and minor details of construction may be resorted to, without departing from the spirit of the invention and scope of the appended claims.

What I claim and wish to secure by U. S. Patent is:

1. The combination with a motor vehicle of a parking device comprising a lifting jack mounted at the front end of the vehicle chassis and adapted to be operated by the motor of the vehicle, said jack including a housing mounted on the vehicle chassis, a hollow screw spindle mounted for vertical axial movement within said housing, a threaded sleeve surrounding said spindle and rotatably mounted in said housing, a wheel at the lower end of said screw spindle, a vertical shaft extending through the bore of said hollow screw spindle and provided with means at its lower end for drivingly connecting it with said wheel, driving means releasably connected with the motor of said vehicle for rotating said threaded sleeve in a direction in which said screw spindle is moved axially downwardly so that the wheel thereon engages the ground and the front end of the vehicle is raised, means at the upper end of said vertical shaft for disconnecting said driving means from said threaded sleeve when the vehicle has been raised and for simultaneously connecting said driving means with said shaft for rotating the latter and the wheel connected thereto, whereby the raised front end of the vehicle is moved sideways until said driving means is disconnected from the motor of the vehicle.

2. The combination with a motor vehicle of a parking device comprising a lifting jack mounted at the front end of the vehicle chassis and adapted to be operated by the motor of the vehicle, said jack including a housing mounted on the vehicle chassis, a hollow screw spindle mounted for vertical axial movement within said housing, a threaded sleeve surrounding said spindle and rotatably mounted in said housing, a wheel at the lower end of said screw spindle, a vertical shaft extending through the bore of said hollow screw spindle and provided with means at its lower end for drivingly connecting it with said wheel, driving means releasably connected with the motor of said vehicle for rotating said threaded sleeve in a direction in which said screw spindle is moved axially downwardly so that the wheel thereon engages the ground and the front end of the vehicle is raised, means at the upper end of said vertical shaft for disconnecting said driving means from said threaded sleeve when the vehicle has been raised and for simultaneously connecting said driving means with said shaft for rotating the latter and the wheel connected thereto, whereby the raised front end of the vehicle is moved sideways until said driving means is disconnected from the motor of the vehicle, and manually controllable means for effecting a rotative adjustment of said hollow screw spindle selectively in either direction about 180° for causing said wheel to move the vehicle sideways either to the left or to the right.

3. The combination with a motor vehicle of a parking device comprising a lifting jack mounted at the front end of the vehicle chassis and adapted to be operated by the motor of the vehicle, said jack including a housing mounted on the vehicle chassis, a hollow screw spindle mounted for vertical axial movement within said housing, a threaded sleeve surrounding said spindle and rotatably mounted in said housing, a wheel at the lower end of said screw spindle, a vertical shaft extending through the bore of said hollow screw spindle and provided with means at its lower end for drivingly connecting it with said wheel, driving means releasably connected with the motor of said vehicle for rotating said threaded sleeve in a direction in which said screw spindle is moved axially downwardly so that the wheel thereon engages the ground and the front end of the vehicle is raised, said driving means including a worm gear integral with a tubular member concentrically surrounding said threaded sleeve, a spring influenced coupling member for normally establishing a direct drive connection between said tubular member and said threaded sleeve, a worm on a shaft driven by the motor of the vehicle, and manually controllable means for bringing said worm in and out of engagement with said worm gear, and means at the upper end of said vertical shaft for disconnecting said driving means from said threaded sleeve when the vehicle has been raised and for simultaneously connecting said driving means with said shaft for rotating the latter and the wheel connected thereto, whereby the raised front end of the vehicle is moved sideways until said worm is disengaged from said worm gear.

4. The combination with a motor vehicle of a parking device comprising a lifting jack mounted at the front end of the vehicle chassis and adapted to be operated by the motor of the vehicle, said jack including a housing mounted on the vehicle chassis, a hollow screw spindle mounted for vertical axial movement within said housing, a threaded sleeve surrounding said spindle and rotatably mounted in said housing, a wheel at the lower end of said screw spindle, a vertical shaft extending through the bore of said hollow screw spindle and provided with means at its lower end for drivingly connecting it with said wheel, driving means releasably connected with the motor of said vehicle for rotating said threaded sleeve in a direction in which said screw spindle is moved axially downwardly so that the wheel thereon engages the ground and the front end of the vehicle is raised, said driving means including a worm gear integral with a tubular member concentrically surrounding said threaded sleeve, a spring influenced coupling member for normally establishing a direct connection between said tubular member and said threaded sleeve, a worm on a shaft driven by the motor of the vehicle, and manually controllable means for bringing said worm in and out of engagement with said worm gear, and means at the upper end of said vertical shaft for disconnecting said driving means from said threaded sleeve when the vehicle has been raised and for simultaneously connecting said driving means with said shaft for rotating the latter and the wheel connected thereto, whereby the raised front end of the vehicle is moved sideways until said worm is disengaged from said worm gear, said manually controllable means being adapted for simultaneously effecting a rotative adjustment of the screw spindle about 180° selectively in either direction when said worm is brought into engagement with said worm gear, whereby said wheel causes the vehicle to be moved sideways either to the left or the right as desired.

5. The combination with a motor vehicle of a parking device comprising a lifting jack mounted at the front end of the vehicle chassis and adapted to be operated by the motor of the vehicle, said jack including a housing mounted on the vehicle chassis, a hollow screw spindle mounted for vertical axial movement within said housing, a threaded sleeve surrounding said spindle and rotatably mounted in said housing, a wheel at the lower end of said screw spindle, a vertical shaft extending through the bore of said hollow spindle and provided with means at its lower end for drivingly connecting it with said wheel, driving means releasably connected with the motor of said vehicle for rotating said threaded sleeve in a direction in which said screw spindle is moved axially downwardly so that the wheel thereon engages the ground and the front end of the vehicle in raised, said driving means including a worm gear integral with a tubular member concentrically surrounding said threaded sleeve and provided with coupling teeth at both ends thereof, a spring influenced coupling sleeve axially slidably mounted on said threaded sleeve and provided at its lower end with coupling teeth normally engaging the coupling teeth at the lower end of said tubular member, and a worm on a shaft driven by the motor of the vehicle for engaging said worm gear, and a coupling member at the upper end of said vertical shaft for disconnecting said slidable coupling sleeve from said tubular member when the vertical shaft has been moved downwardly a predetermined distance at which the front end of the vehicle has been raised off the ground and for simultaneously connecting said coupling member on said shaft with the coupling teeth at the upper end of said tubular member, whereby said vertical shaft is rotated to drive the wheel at the lower end of the screw spindle for moving the front end of the vehicle sideways until said driving means is disconnected from the motor of the vehicle.

6. The combination with a motor vehicle of a parking device comprising a lifting jack mounted at the front end of the vehicle chassis and adapted to be operated by the motor of the vehicle, said jack including a housing mounted on the vehicle chassis, a hollow screw spindle mounted for vertical axial movement within said housing, a threaded sleeve surrounding said spindle and rotatably mounted in said housing, a wheel at the lower end of said screw spindle, a vertical shaft extending through the bore of said hollow screw spindle and provided with means at its lower end for drivingly connecting it with said wheel, driving means releasably connected with the motor of said vehicle for rotating said threaded sleeve in a direction in which said screw spindle is moved axially downwardly so that the wheel thereon engages the ground and the front end of the vehicle is raised, said driving means including a worm gear integral with a tubular member concentrically surrounding said threaded sleeve and provided with coupling teeth at both ends thereof, a spring influenced coupling sleeve axially slidably mounted on said threaded sleeve and provided at its lower end with coupling teeth normally engaging the coupling teeth at the lower end of said tubular member, and a worm on a shaft driven by the motor of the vehicle for engaging said worm gear, a coupling member at the upper end of said vertical shaft for disconnecting said slidable coupling sleeve from said tubular member when the vertical shaft has been moved downwardly a predetermined distance at which the front end of the vehicle has been raised off the ground and for simultaneously connecting said coupling member on said shaft with the coupling teeth at the upper end of said tubular member, whereby said vertical shaft is rotated to drive the wheel at the lower end of the screw spindle for moving the front end of the vehicle sideways until said driving means is disconnected from the motor of the vehicle, and manually controllable means for effecting a rotative adjustment of said hollow screw spindle selectively in either direction about 180° for causing said wheel to move the vehicle sideways either to the left or to the right.

7. The combination with a motor vehicle of a parking device comprising a lifting jack mounted at the front end of the vehicle chassis and adapted to be operated by the motor of the vehicle, said jack including a housing mounted on the vehicle chassis, a hollow screw spindle mounted for vertical axial movement within said housing, a threaded sleeve surrounding said spindle and rotatably mounted in said housing, a wheel at the lower end of said screw spindle, a vertical shaft extending through the bore of said hollow screw spindle and provided with means at its lower end for drivingly connecting it with said wheel, driving means releasably connected with the motor of said vehicle for rotating said threaded sleeve in a direction in which said screw spindle is moved axially downwardly so that the wheel thereon engages the ground and the front end of the vehicle is raised, said driving means including a worm gear integral with a tubular member concentrically surrounding said threaded sleeve and provided with coupling teeth at both ends thereof, a spring influenced coupling sleeve axially slidably mounted on said threaded sleeve and provided at its lower end with coupling teeth normally engaging the coupling teeth at the lower end of said tubular member, a worm on a shaft driven by the motor of the vehicle for engaging said worm gear, and manually controllable means for bringing said worm in and out of engagement with said worm gear, and a coupling member at the upper end of said vertical shaft for disconnecting said slidable coupling sleeve from said tubular member when the vertical shaft has been moved downwardly a predetermined distance at which the front end of the vehicle has been raised off the ground and for simultaneously connecting said coupling member on said shaft with the coupling teeth at the upper end of said tubular member, whereby said vertical shaft is rotated to drive the wheel at the lower end of the screw spindle for moving the front end of the vehicle sideways until said worm has been brought out of engagement with said worm gear.

8. The combination with a motor vehicle of a parking device comprising a lifting jack mounted at the front end of the vehicle chassis and adapted to be operated by the motor of the vehicle, said jack including a housing mounted on the vehicle chassis, a hollow screw spindle mounted for vertical axial movement within said housing, a threaded sleeve surrounding said spindle and rotatably mounted in said housing, a wheel at the lower end of said screw spindle, a vertical shaft extending through the bore of said hollow screw spindle and provided with means at its lower end for drivingly connecting it with said wheel, driving means releasably connected with the motor of said vehicle for rotating said threaded sleeve in a direction in which said screw spindle is moved axially downwardly so that the wheel thereon engages the ground and the front end of the vehicle is raised, said driving means including a worm gear integral with a tubular member concentrically surrounding said threaded sleeve and provided with coupling teeth at both ends thereof, a spring influenced coupling sleeve axially slidably mounted on said threaded sleeve and provided at its lower end with coupling teeth normally engaging the coupling teeth at the lower end of said tubular member, a worm on a shaft driven by the motor of the vehicle for engaging said worm gear, and manually controllable means for bringing said worm in and out of engagement with said worm gear, and a coupling member at the upper end of said vertical shaft for disconnecting said slidable coupling sleeve from said tubular member when the vertical shaft has been moved downwardly a predetermined distance at which the front end of the vehicle has been raised off the ground and for simultaneously connecting said coupling member on said shaft with the coupling teeth at the upper end of said tubular member, whereby said vertical shaft is rotated to drive the wheel at the lower end of the screw spindle for moving the front end of the vehicle sideways until said worm has been brought out of engagement with said worm gear, said manually controllable means being adapted for simultaneously effecting a rotative adjustment of the screw spindle about 180° selectively in either direction when said worm is brought into engagement with said worm gear, whereby said wheel causes the vehicle to be moved sideways either to the left or the right as desired.

9. The combination with a motor vehicle of a parking device comprising a lifting jack mounted at the front end of the vehicle chassis and adapted to be operated by the motor of the vehicle, said jack including a housing mounted on the vehicle chassis, a hollow screw spindle mounted for vertical axial movement within said housing, a threaded sleeve surrounding said spindle and rotatably mounted in said housing, a wheel at the lower end of said screw spindle, a vertical shaft extending through the bore of said hollow screw spindle and provided with means at its lower end for drivingly connecting it with said wheel, driving means releasably connected with the motor of said vehicle for rotating said threaded sleeve in a direction in which said screw spindle is moved axially downwardly so that the wheel thereon engages the ground and the front end of the vehicle is raised, means at the upper end of said vertical shaft for disconnecting said driving means from said threaded sleeve when the vehicle has been raised and for simultaneously connecting said driving means with said shaft for rotating the latter and the wheel connected thereto, whereby the raised front end of the vehicle is moved sideways until said driving means is disconnected from the motor of the vehicle, manually controllable means for effecting a rotative adjustment of said hollow screw spindle selectively in either direction about 180° for causing said wheel to move the vehicle sideways either to the left or to the right, and spring actuated means for locking said hollow screw spindle against rotation in either one of its adjusted positions.

10. The combination with a motor vehicle of a parking device comprising a lifting jack mounted at the front end of the vehicle chassis and adapted to be operated by the motor of the vehicle, said jack including a housing mounted on the vehicle chassis, a hollow screw spindle mounted for vertical axial movement within said housing, a nut on said spindle and rotatably mounted in said housing, a wheel at the lower end of said hollow screw spindle and mounted to rotate about a horizontal axis, a vertical shaft extending through the bore of said hollow screw spindle, a gearing within the lower end of said screw spindle for drivingly connecting said vertical shaft with said wheel, driving means releasably connected with the motor of the vehicle for rotating said nut in a direction in which said vertical screw spindle including the shaft therein is axially displaced downwardly so that said wheel engages the ground and the front end of the vehicle is raised off the ground, and means at the upper end of said vertical shaft for drivingly connecting said shaft with said driving means when the vehicle has been raised a predetermined distance and for simultaneously discontinuing the rotation of said nut, said vertical shaft when being rotated by said driving means causing said wheel to rotate, whereby the raised front end of the motor vehicle is moved sideways until said driving means is disconnected from the motor of the vehicle.

11. The combination with a motor vehicle of a parking device comprising a lifting jack mounted at the front end of the vehicle chassis and adapted to be operated by the motor of the vehicle, said jack including a housing mounted on the vehicle chassis, a hollow screw spindle mounted for vertical axial movement within said housing, a nut on said spindle and rotatably mounted in said housing, a wheel at the lower end of said hollow screw spindle and mounted to rotate about a horizontal axis, a vertical shaft extending through the bore of said hollow screw spindle, a gearing within the lower end of said screw spindle for drivingly connecting said vertical shaft with said wheel, driving means releasably connected with the motor of the vehicle for rotating said nut in a direction in which said vertical screw spindle including the shaft therein is axially displaced downwardly so that said wheel engages the ground and the front end of the vehicle is raised off the ground, said driving means including an annular worm gear in said housing and concentrically surrounding said nut on said screw spindle, means forming a friction clutch between the inner diameter of said worm gear and the outer diameter of said nut, coupling teeth on the upper side of said worm gear, and a worm engaging said worm gear and mounted on a shaft driven by the motor of said vehicle, and means at the upper end of said vertical shaft for drivingly connecting said shaft with the coupling teeth of said worm gear when the vehicle has been raised a predetermined distance and for simultaneously discontinuing the rotation of said nut, said vertical shaft when being rotated by said worm gear causing said wheel to rotate, whereby the raised front end of the motor vehicle is moved sideways until said driving means is disconnected from the motor of the vehicle.

12. The combination with a motor vehicle of a parking device comprising a lifting jack mounted at the front end of the vehicle chassis and adapted to be operated by the motor of the vehicle, said jack including a housing mounted on the vehicle chassis, a hollow screw spindle mounted for vertical axial movement within said housing, a nut on said spindle and rotatably mounted in said housing, a wheel at the lower end of said hollow screw spindle and mounted to rotate about a horizontal axis, a vertical shaft extending through the bore of said hollow screw spindle, a gearing within the lower end of said screw spindle for drivingly connecting said vertical shaft with said wheel, driving means releasably connected with the motor of the vehicle for rotating said nut in a direction in which said vertical screw spindle including the shaft therein is axially displaced downwardly so that said wheel engages the ground and the front end of the vehicle is raised off the ground, said driving means including an annular worm gear in said housing and concentrically surrounding said nut on said screw spindle, means forming a friction clutch between the inner diameter of said worm gear and the outer diameter of said nut, coupling teeth on the upper side of said worm gear, and a worm engaging said worm gear and mounted on a shaft driven by the motor of said vehicle, means at the upper end of said vertical shaft for drivingly connecting said shaft with the coupling teeth of said worm gear when the vehicle has been raised a predetermined distance and for simultaneously discontinuing the rotation of said nut, said vertical shaft when being rotated by said worm gear causing said wheel to rotate, whereby the raised front end of the motor vehicle is moved sideways until said driving means is disconnected from the motor of the vehicle, and manually controllable means for effecting a rotative adjustment of said hollow screw spindle selectively in either direction about 180° for causing said wheel to move the vehicle sideways either to the left or to the right.

13. The combination with a motor vehicle of a parking device comprising a lifting jack mounted at the front end of the vehicle chassis and adapted to be operated by the motor of the vehicle, said jack including a housing mounted on the vehicle chassis, a hollow screw spindle mounted for vertical axial movement within said housing, a nut on said spindle and rotatably mounted in said housing, a wheel at the lower end of said hollow screw spindle and mounted to rotate about a horizontal axis, a vertical shaft extending through the bore of said hollow screw spindle, a gearing within the lower end of said screw spindle for drivingly connecting said vertical shaft with said wheel, driving means releasably connected with the motor of the vehicle for rotating said nut in a direction in which said vertical screw spindle including the shaft therein is axially displaced downwardly so that said wheel engages the ground and the front end of the vehicle is raised off the ground, said driving means including an annular worm gear in said housing and concentrically surrounding said nut on said screw spindle, means forming a friction clutch between the inner diameter of said worm gear and the outer diameter of said nut, coupling teeth on the upper side of said worm gear, and a worm engaging said worm gear and mounted on a shaft driven by the motor of said vehicle, means at the upper end of said vertical shaft for drivingly connecting said shaft with the coupling teeth of said worm gear when the vehicle has been raised a predetermined distance and for simultaneously discontinuing the rotation of said nut, said vertical shaft when being rotated by said worm gear causing said wheel to rotate, whereby the raised front end of the motor vehicle is moved sideways until said driving means is disconnected from the motor of the vehicle, and means operated by said screw spindle for visibly indicating to the driver of the vehicle the position, whether raised or lowered of the lifting wheel.

14. The combination with a motor vehicle of a parking device comprising a lifting jack mounted permanently at the front end of the vehicle chassis and adapted to be operated by the motor of the vehicle, and bumper assemblies at the front and rear end respectively of the vehicle, the vehicle having rear wheels mounted on an axle and the bumper bars at the front and rear end of the vehicle being curved on radii extending from the middle point of said rear wheel axle to the rear bumper and to the front bumper respectively.

HUBERT JEZLER.